(No Model.) 3 Sheets—Sheet 1.
W. A. MARSH & H. N. PHARR.
CANE CONVEYER.
No. 601,578. Patented Mar. 29, 1898.
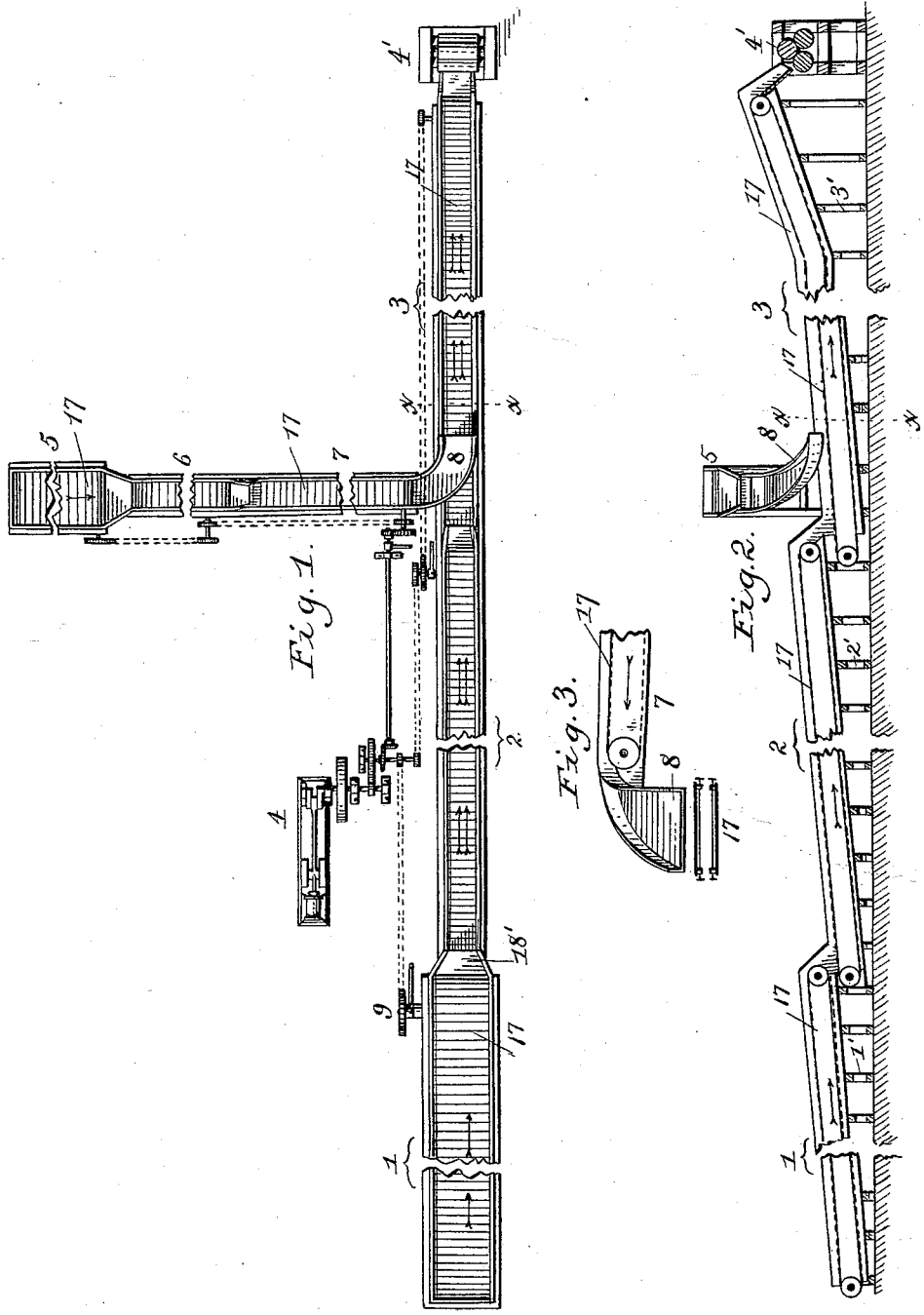
Witnesses.
Chas. J. Buchheit.
Alex. F. McHardy.
Inventors
Henry N. Pharr.
William A. Marsh.
By Thomas McCarty Atty.

(No Model.)   3 Sheets—Sheet 2.

W. A. MARSH & H. N. PHARR.
CANE CONVEYER.

No. 601,578.   Patented Mar. 29, 1898.

Witnesses: Chas. J. Buchheit, Alex. F. McHardy.

Inventors: Henry N. Pharr, William A. Marsh.
By Thomas McCarty, Att'y.

(No Model.) 3 Sheets—Sheet 3.
W. A. MARSH & H. N. PHARR.
CANE CONVEYER.
No. 601,578. Patented Mar. 29, 1898.
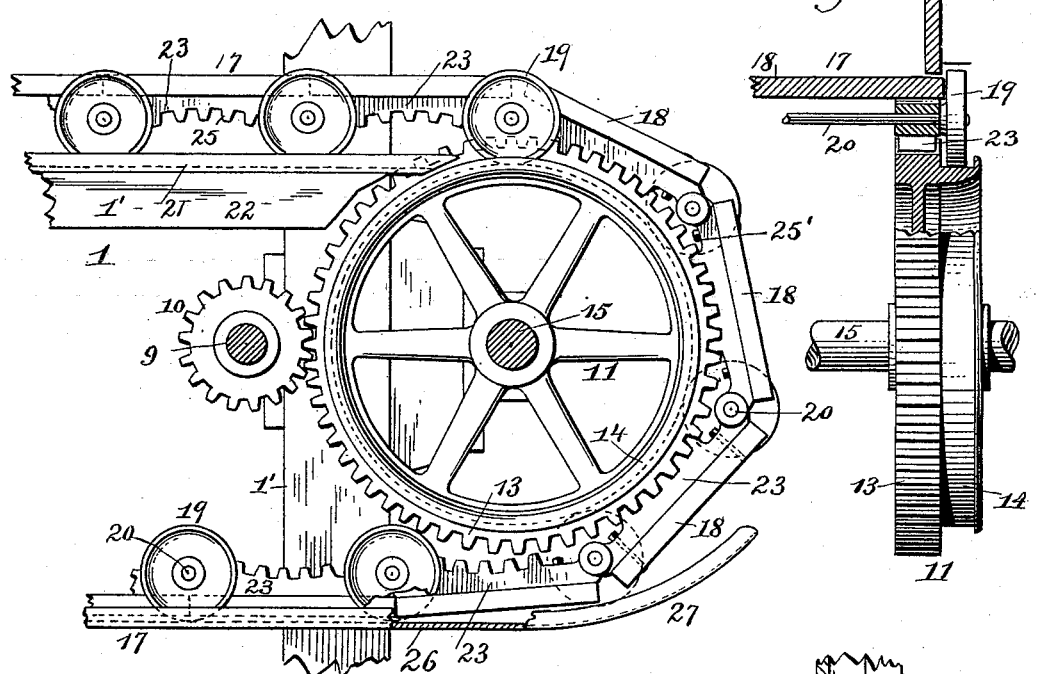
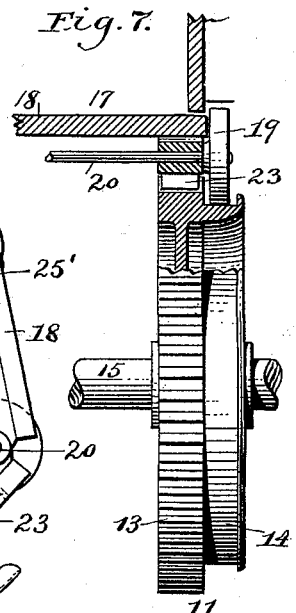
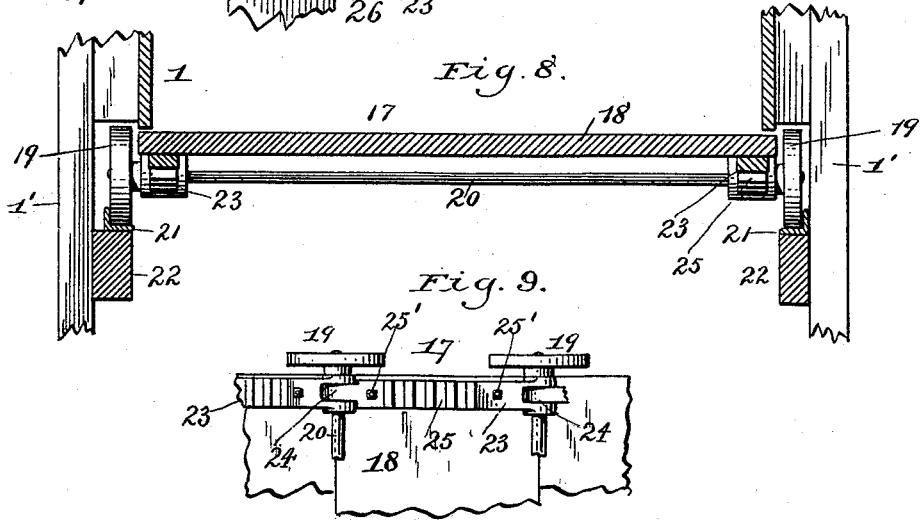
Witnesses: Chas. J. Buchheit, Alex. F. McHardy.
Inventors: Henry N. Pharr, William A. Marsh.
By Thomas McCarty, Atty.

UNITED STATES PATENT OFFICE.

WILLIAM A. MARSH AND HENRY N. PHARR, OF NEAR BERWICK, LOUISIANA.

CANE-CONVEYER.

SPECIFICATION forming part of Letters Patent No. 601,578, dated March 29, 1898.

Application filed July 17, 1897. Serial No. 645,635. (No model.)

*To all whom it may concern:*

Be it known that we, WILLIAM AUSTIN MARSH and HENRY NEWTON PHARR, citizens of the United States, residing near Berwick, in the parish of St. Mary and State of Louisiana, have invented certain new and useful Improvements in Cane-Conveyers; and we do declare the following to be a full, clear, and exact description of the invention, such as will enable others skilled in the art to which it appertains to make and use the same.

Our invention relates to an improvement in a system for feeding and distributing cane to a mill-carrier, as shown in the accompanying drawings; and the objects of our invention are to facilitate the handling of cane, save labor, and reduce the expense of production of sugar.

Our invention consists in the construction and combination of one or more storage-carriers to receive the cane from the field when dumped from carts, cars, or boats; and the construction of these storage-carriers, with reference to the main or mill-feed carrier, is such that either one or both of said storage-carriers will deliver their loads gradually upon the main carrier or that one or both of said storage-carriers can be operated independently and by a single apparatus in such manner that the main carrier is supplied constantly from either one or both supply sources. We attain these objects by the mechanism illustrated in the accompanying drawings, in which—

Figure 4:
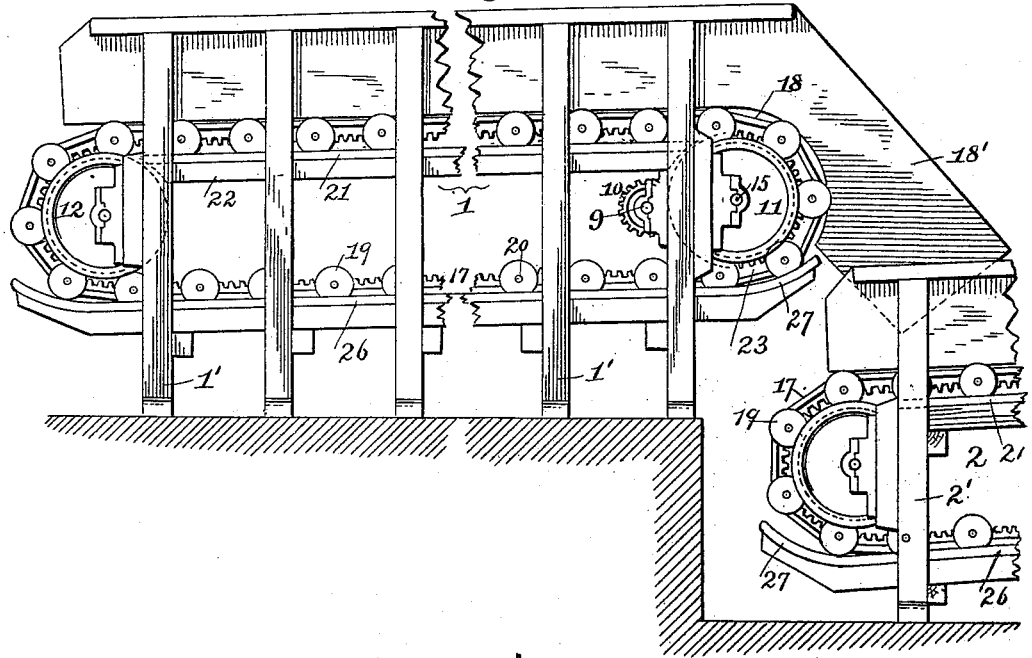
Figure 5:
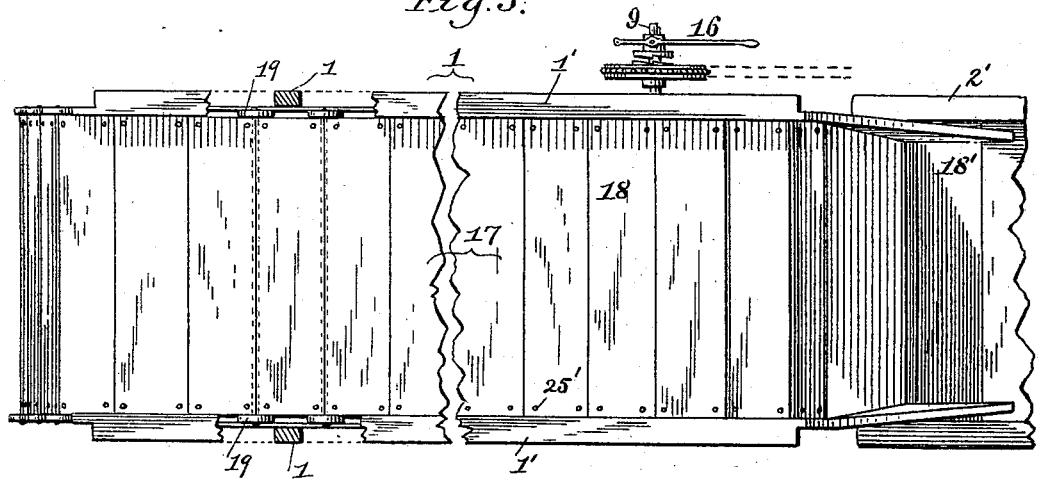

Figure 1 is a plan view of a sugar-mill provided with our improved carrying apparatus. Fig. 2 is a longitudinal or sectional elevation. Fig. 3 is a cross-section in line $x$ $x$, Fig. 2. Fig. 4 is a fragmentary side elevation of one of the storage-carriers and adjacent parts. Fig. 5 is a plan view thereof. Fig. 6 is a fragmentary elevation of one of the storage-carriers, showing one side of the supporting-frames removed. Fig. 7 is a fragmentary cross-section of the drawing-drum and connecting parts of said carrier. Fig. 8 is a fragmentary cross-section of the carrier. Fig. 9 is a fragmentary inverted view of a portion of the carrier.

Similar numerals refer to similar parts throughout the several views.

In the drawings numeral 1 represents the longitudinal storage-carrier, 2 showing the secondary or auxiliary carrier, 3 the main or mill carrier, and 4 the crushing or squeezing mill or rollers, all of which parts are arranged in line, so that the cane is successively carried from one carrier and distributed on the next succeeding carrier.

5 is an auxiliary storage-carrier arranged at an angle to the main carrier 3.

6 is a secondary carrier, and 7 is the final carrier, delivering the cane onto the main carrier 3 by means of a downwardly and forwardly inclined chute or spout 8. The speed or traveling velocity of these various carriers gradually diminishes or is reduced from the main carrier 3 to the storage-carrier 1 and in the auxiliary carriers from the final carrier 7 to the storage-carrier 5.

The following numerals refer to the various parts and which will be referred to in their order, viz: 1 designates a storage-carrier; 1', frame of same. 2 is a distributing-carrier; 2', frame of same. 3 is a mill-carrier; 3', frame of same. 4 is an engine; 4', a mill. 5 is an auxiliary or lateral storage-carrier. 6 is a distributing-carrier. 7 is an auxiliary mill-carrier. 8 is a curved inclined spout. 9 is a main shaft. 10 are pinions. 11 is a driving-drum. 12 is a plain carrying-drum. 13 shows gear of driving-drum. 14 is a flange (grooved) of drum 11. 15 is a counter-shaft of drum 11. 16 is a shifting-lever of clutch of shaft 9. (See Fig. 5.) 17 are carrier-slats. 18 are sectional boards of same; 18', spout of carrier 1. 19 are carrier-rollers. 20 is a roller-shaft. 21 is an upper track or guide for roller 19. 22 is a support of frame for same. 23 are segmental links of carrier. 24 are joints of same. 25 are gear-teeth on segments. 25' are bolts of segments. 26 is a lower guide or track for rollers. 27 is a curved guide for lower track.

By our system it can be readily seen that as the load of cane contained in the storage-carrier 1 is gradually carried to the next carrier 2 the cane as it is delivered on the latter carrier is spread or separated by reason of the increased speed of this carrier, and as it delivers its cane upon the main carrier 3 the cane is again separated and uniformly distributed, ready for the cane-mill or roller, by reason of the increased speed of this carrier over the preceding one. In this manner the cane is likewise distributed from the auxiliary carriers 5, 6, and 7 into the main carrier 3. By connecting the auxiliary carriers with the main feed in this manner a constant source of supply is found from either the auxiliary storage-carrier, the field storage-carrier, or from both sources constantly or intermittently. By our system a single operator stationed at the junction of these carriers is enabled to throw either one or both carriers supplying the main carrier into operation, as he can readily observe both sources of supply from this position. Should the auxiliary supply be less than the capacity of the main mill-carrier, he causes the carrier 2 to deliver its load in conjunction with the final auxiliary carrier 7 upon the main carrier 3. Each of the main storage-carriers 1 and 5 is operated by a signal from the junction operator to the operators stationed at these storage-carriers, each of which has a clutch device for throwing it in and out of gear with the source of power. By this construction and arrangement a large number of unnecessary laborers are dispensed with in the handling and distribution of the cane from the carts, cars, or boats to the main carrier of a sugar-mill.

1', 2', and 3' are the supporting-frames of the various carriers; 4, the engine or source of power connected with the carriers in any suitable manner, so that the speed from the storage-carriers is gradually increased to the main mill-carrier. The storage-carriers are of such size as to obviate the necessity of piling or storing the cane in or around the sugarhouse and necessitating the rehandling of same.

9 is the main driving-shaft of the storage-carriers and which is thrown into gear by means of a shifting-lever 16 of well-known construction.

10 are gear-pinions meshing with gear of 13 on the main drum 11, which latter are supported on counter-shaft 15, journaled in bearings on the frame of the carrier. The drums 11 are arranged on the inner sides of supporting-frame 1' at the front or delivery end thereof and are provided at their outer faces with annular flanged grooves 14, in which are guided and supported the rollers 19 of the carrier 17. The latter is composed of a series of closely-fitting transverse blades or boards secured to endless series of links 23 by bolts 25. The links 23 are provided with hinged joints 24 where they are secured to each other between the adjacent edges of the boards 18 by transverse shafts 20, on the outer ends of which the rollers 19 are supported. The links 23 are provided between these joints with concaved or segmentally toothed surfaces 25, which correspond to and engage with the teeth of the gear-rim 13 of the driving-drum 11.

12 represents two drums arranged at the opposite end of the carrier, which are likewise grooved to support the rollers 19 of the carrier 17.

21 are guides or tracks arranged on the inner side of the main frame of the driving-drums 11 and 12 for supporting and guiding the rollers 19 of the carrier horizontally between these points. These tracks are preferably formed of angle-iron, so as to hold the carrier-frame 17 against lateral displacement, and are secured to the upper sides of longitudinal stringers 22.

26 are tracks arranged below the drums 11 and 12 for guiding and supporting the rollers 19 and carrier 17, which the latter traverses backwardly. The front ends of these tracks are curved upwardly and at a slight curved tangent to the drums 11, so as to insure engagement with the rollers 19 and properly guide the latter onto the main portion of these tracks.

The supporting-frames of the carriers are provided with vertical guide-boards arranged slightly above the outer sides of the carrier for holding the cane in confinement on carrier, and which guide-boards terminate at their front ends inclined chutes 18', conducting the cane to the next succeeding carrier. By providing the links of the carrier-belt with curved arc-shaped or segmental racks or gear-teeth surfaces, which arcs correspond with the arc of the gear-rimmed surfaces of the driving-drums 11, the surface of contact between these arcs and said gear-rim is greatly enlarged, and the consequent danger of slipping or disengagement of the parts entirely obviated.

A striking advantage of our invention is its economical construction, great saving of labor, and ease by which the same may be operated.

Having described our invention and the manner in which the same is or may be carried into operation, we would say in conclusion that we do not limit ourselves to the precise details shown in illustration, as the same may be varied to some extent; but

What we claim, and desire to secure by Letters Patent, is—

1. An apparatus for feeding cane to a mill, comprising a series of endless carriers and means for operating said carriers at increasing rates of speed as they approach the mill, each of said carriers, except the last, being arranged to let the cane fall upon the succeeding carrier, whereby the cane is automatically leveled, spread and delivered to the mill end on, substantially as described.

2. An apparatus for feeding cane to a mill, comprising a series of main carriers feeding directly to the mill, a series of auxiliary carriers positioned at an angle to the series of main carriers, means for moving the successive main and auxiliary carriers at increasing speeds as they approach the mill, each of said carriers, except the last, being so arranged as to let the cane fall upon the succeeding carrier, whereby the cane is automatically leveled, spread, and delivered to the mill end on, substantially as described.

In testimony whereof we affix our signatures in presence of two witnesses.

WILLIAM A. MARSH.
HENRY N. PHARR.

Witnesses:
WILLIAM WILSON,
LEON COPES.